United States Patent
Dasgupta et al.

(10) Patent No.: US 8,756,610 B2
(45) Date of Patent: *Jun. 17, 2014

(54) DYNAMICALLY SCALING MULTI-TIER APPLICATIONS VERTICALLY AND HORIZONTALLY IN A CLOUD ENVIRONMENT

(75) Inventors: Gargi Banerjee Dasgupta, Gurgaon (IN); Sankalp Gera, New Delhi (IN); Akshat Verma, New Delhi (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/431,751

(22) Filed: Mar. 27, 2012

(65) Prior Publication Data

US 2013/0174149 A1    Jul. 4, 2013

Related U.S. Application Data

(63) Continuation of application No. 13/340,985, filed on Dec. 30, 2011.

(51) Int. Cl.
*G06F 9/455* (2006.01)
*G06F 9/46* (2006.01)

(52) U.S. Cl.
USPC .......................... 718/105; 718/104

(58) Field of Classification Search
None
See application file for complete search history.

(56) References Cited

U.S. PATENT DOCUMENTS

| | | |
|---|---|---|
| 7,886,055 B1 | 2/2011 | Zhou et al. |
| 2004/0210871 A1 * | 10/2004 | Hasegawa et al. ............ 717/120 |
| 2005/0108712 A1 | 5/2005 | Goyal |
| 2009/0158275 A1 | 6/2009 | Wang et al. |
| 2009/0327459 A1 | 12/2009 | Yoo et al. |
| 2010/0088150 A1 | 4/2010 | Mazhar et al. |
| 2011/0022861 A1 * | 1/2011 | Agneeswaran et al. ....... 713/310 |

FOREIGN PATENT DOCUMENTS

| | | |
|---|---|---|
| CN | 1538297 A | 10/2004 |
| CN | 102004671 A | 4/2011 |
| CN | 102279771 A | 12/2011 |
| JP | 2004000018 A | 1/2004 |

OTHER PUBLICATIONS

Urgaonkar, et al., "Dynamic Provisioning of Multi-tier Internet Applications," Autonomic Computing, 2005. ICAC 2005. Proceedings. Second International Conference, pp. 1-12.
"SmartScale: Automatic Application Scaling in Enterprise Clouds," Oct. 10, 2010, pp. 1-12.
International Search Report for International Application No. PCT/CN2012/084552, dated Feb. 28, 2013, pp. 1-10.

* cited by examiner

*Primary Examiner* — Abdullah Al Kawsar
*Assistant Examiner* — Bradley Teets
(74) *Attorney, Agent, or Firm* — Holland & Knight LLP; Brian J. Colandreo, Esq.; Jeffrey T. Placker, Esq.

(57) ABSTRACT

A computer program product, a system and method for scaling are provided. The method of scaling may include determining a predicted workload of a multi-tier application for a defined time period. A change in application capacity for the predicted workload may be determined. A scaling strategy may be dynamically selected for the change in application capacity. The scaling strategy may include vertical scaling and horizontal scaling.

7 Claims, 4 Drawing Sheets

DYNAMICALLY SCALING MULTI-TIER APPLICATIONS VERTICALLY AND HORIZONTALLY IN A CLOUD ENVIRONMENT

RELATED APPLICATIONS

The subject application is a continuation application of U.S. patent application with Ser. No. 13/340,985, filed 30 Dec. 2011, the entire content of which is herein incorporated by reference.

TECHNICAL FIELD

The present disclosure generally relates to cloud computing and cloud computing applications, and more particularly relates to scaling application in cloud computing environments.

BACKGROUND

Cloud computing generally refers to server-based computing resources that are accessible via a computing network, such as a wide area network, Internet, or the like. The computing resources may include applications that may be executed on remotely accessible servers, termed cloud servers; data storage; and the like. In a cloud environment, all processing and data storage may take place on the cloud servers and associated storage devices. As such, it is not necessary for users of cloud computing resources to locally store data or execute the applications being utilized.

Cloud computing resources may generally be susceptible to being adapted to serve a given demand or need, for example by providing additional processing or storage resources. However, because the demand place on a cloud application can vary with time, it is necessary to manage the resources that are available. If the available resources are insufficient for a given demand, performance of the cloud application may be compromised. Conversely, if the available cloud resources greatly excel the demand, the resources may be wasted, resulting in unnecessary costs or lost opportunity in which the resources could have been applied to other needs. Burst activity, in which the demand placed on resources may increase very rapidly, for example, increasing may many multiples or orders of magnitude over the course of minutes or a few hours, can create many challenges to cloud resource management.

SUMMARY OF THE DISCLOSURE

In a first embodiment a method of scaling may include determining, by a computing device, a predicted workload of a multi-tier application for a defined time period. A change in application capacity for the predicted workload may be determined. A scaling strategy may be dynamically selected for the change in application capacity. The scaling strategy may include vertical scaling and horizontal scaling.

One or more of the following features may be included. The scaling strategy may include implementing a plurality of virtual machines executing the multi-tier application. Each of the plurality of virtual machines may have generally equally configured resource allocations. At least one virtual machine may be implemented having a lower resource allocation. If the change in application capacity is less than a remaining capacity of the virtual machine having a lower resource allocation, selecting the scaling strategy may include vertically scaling the virtual machine having the lower resource allocation up to the generally equally configured resource allocation. If the change in application capacity is greater than a remaining capacity of the virtual machine having the lower resource allocation, selecting the scaling strategy may include vertically scaling the virtual machine having the lower resource allocation up to the generally equally configured resource allocation and horizontally scaling the application including implementing a new virtual machine having a resource allocation less than the generally equally configured resource allocation.

Dynamically selecting a scaling strategy may include continuously selecting a scaling strategy based upon, at least in part, the predicted workload. Determining a predicted workload may be based upon, at least in part, historical workload demands. Dynamically selecting a scaling strategy may include scaling resources associated with a determined tier of the multi-tier application.

According to another implementation, a computer program product includes a computer readable medium having a plurality of instructions stored on it. When executed by a processor, the instructions may cause the processor to perform operations including determining a predicted workload of a multi-tier application for a defined time period. The instruction may also cause the processor to determine a change in application capacity for the predicted workload. A scaling strategy may be dynamically selected for the change in application capacity, the scaling strategy including vertical scaling and horizontal scaling.

One or more of the following features may be included. The scaling strategy may include implementing a plurality of virtual machines executing the multi-tier application. Each of the plurality of virtual machines may have generally equally configured resource allocations. At least one virtual machine may be implemented having a lower resource allocation. If the change in application capacity is less than a remaining capacity of the virtual machine having a lower resource allocation, the instructions for selecting the scaling strategy may include instructions for vertically scaling the virtual machine having the lower resource allocation up to the generally equally configured resource allocation. If the change in application capacity is greater than a remaining capacity of the virtual machine having the lower resource allocation, the instructions for selecting the scaling strategy may include instructions for vertically scaling the virtual machine having the lower resource allocation up to the generally equally configured resource allocation and horizontally scaling the application including implementing a new virtual machine having a resource allocation less than the generally equally configured resource allocation.

The instructions for dynamically selecting a scaling strategy may include instructions for continuously selecting a scaling strategy based upon, at least in part, the predicted workload. Determining a predicted workload may be based upon, at least in part, historical workload demands. The instructions for dynamically selecting a scaling strategy may include instructions for scaling resources associated with a determined tier of the multi-tier application.

According to another implementation, a system may include a processor and a memory architecture coupled with the processors. A first software module may be executable by the processor and the memory architecture. The first software module may be configured to determine a predicted workload of a multi-tier application for a defined time period. A second software module may also be executable by the processor and the memory architecture. The second software module may be configured to determine a change in application capacity for the predicted workload. A third software module may also be executable by the processor and the memory architecture.

The third software module may be configured to dynamically select a scaling strategy for the change in application capacity, the scaling strategy including vertical scaling and horizontal scaling.

One or more of the following features may be included. The scaling strategy may include implementing a plurality of virtual machines executing the multi-tier application. Each of the plurality of virtual machines may have generally equally configured resource allocations. At least one virtual machine may be implemented having a lower resource allocation. If the change in application capacity is less than a remaining capacity of the virtual machine having a lower resource allocation, the third software module may be configured to vertically scale the virtual machine having the lower resource allocation up to the generally equally configured resource allocation. If the change in application capacity is greater than a remaining capacity of the virtual machine having the lower resource allocation, the third software module may be configured to vertically scale the virtual machine having the lower resource allocation up to the generally equally configured resource allocation and horizontally scale the application including implementing a new virtual machine having a resource allocation less than the generally equally configured resource allocation.

The third software module may be configured to continuously select a scaling strategy based upon, at least in part, the predicted workload. The first software module may be configured to determine a predicted workload based upon, at least in part, historical workload demands. The third software module may be configured to scale resources associated with a determined tier of the multi-tier application.

According to another implementation, a method of scaling includes determining, by a computing device, a predicted workload of a multi-tier application for a defined time period. A change in application capacity is determined for the predicted workload. A scaling strategy is dynamically selected for the change in application capacity. The scaling strategy includes implementing a plurality of virtual machines executing the multi-tier application, in which each of the plurality of virtual machines may have generally equally configured resource allocations. The scaling strategy may also include implementing at least one virtual machine having a lower resource allocation.

The details of one or more implementations are set forth in the accompanying drawings and the description below. Other features will become apparent from the description, the drawings, and the claims.

DETAILED DESCRIPTION OF ILLUSTRATIVE EMBODIMENTS

Figure 1:
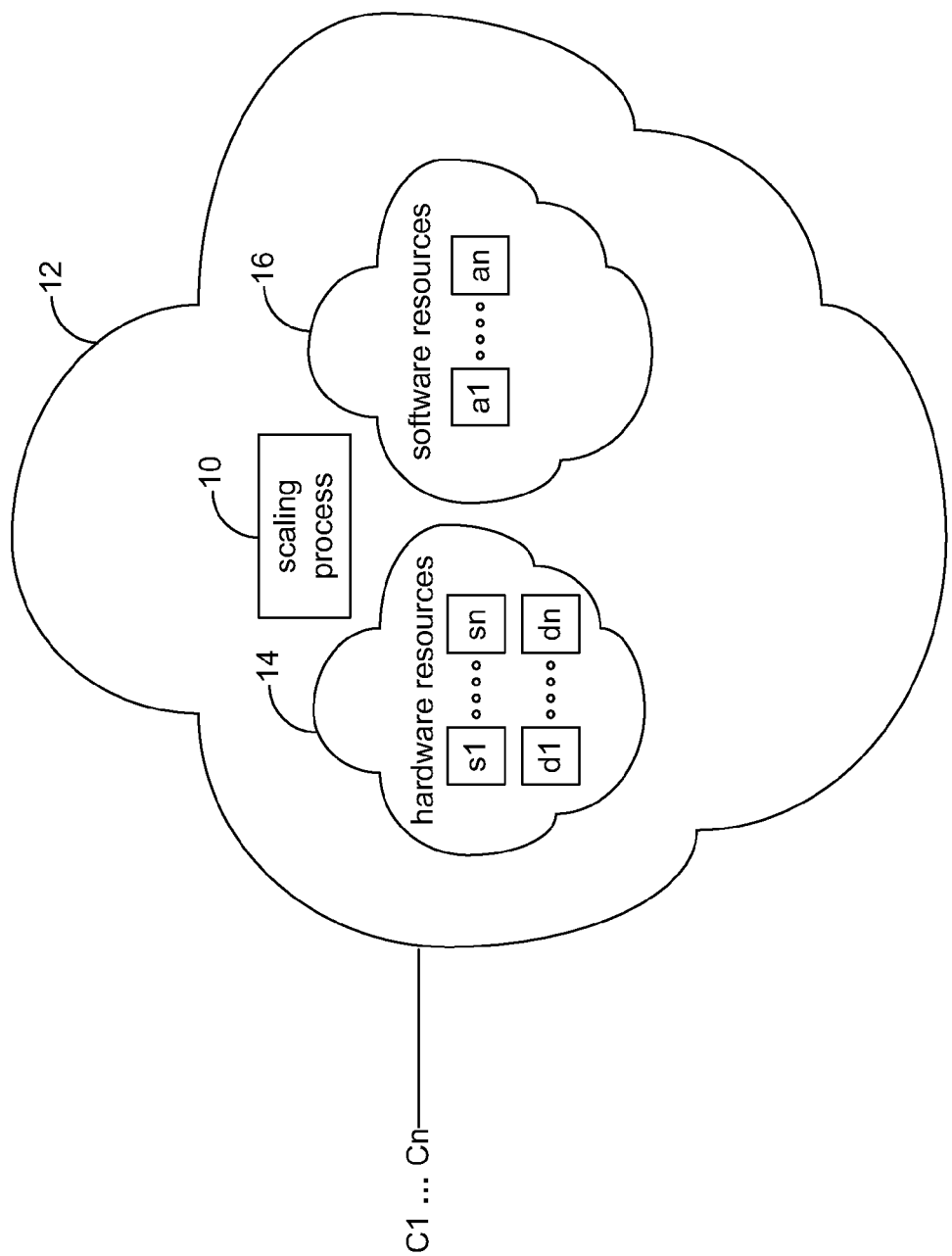
FIG. 1 diagrammatically depicts scaling process coupled to a cloud computing environment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown scaling process 10 that may control, at least in part, the allocation of resources within cloud computing environment 12. As shown, cloud environment 12 may include hardware resources 14 and software resources 16. Hardware resources 14 may include, but are not limited to, one or more server computers (e.g., servers s1 through sn) and one or more storage devices (e.g., storage devices d1 through dn). Software resources 16 may include one or more cloud based applications (e.g., applications a1 through an). Further, one or more of applications a1 through an may include a multi-tier application. As is understood, a multi-tier application may include a plurality of interacting modules and/or components, or may include a plurality of discrete, interacting applications. For example, a multi-tier application may include a user interface component (e.g., which may generate and output displays that may be viewed by clients C1 through Cn), an application component (e.g., which may control the applications functionality), and a data component (e.g., which may store and retrieve information that may be utilized by the application component). Other examples of multi-tier applications may include components having differing functionality, and as such, the foregoing example should not be construed as a limitation of the present disclosure.

An example of servers s1 through sn (e.g., which may include one or more processors and one or more memory architectures; not shown) may include, but is not limited to, a blade server (such as an IBM BladeCenter PS704 Express) or other server computer. Examples of storage devices d1 through dn may include, but are not limited to, a hard disk drive, a solid state drive, an optical drive, random access memory, read only memory, and the like. Servers s1 through sn may each execute an appropriate operating system, such as Red Hat® Linux® for example, which may be stored on one or more of storage devices d1 through dn. (Red Hat is a registered trademark of Red Hat Corporation in the United States, other countries or both; and Linux is a registered trademark of Linus Torvalds in the United States, other countries or both.)

While not shown, cloud environment 12 may include additional hardware and software that may allow hardware resources 14 and software resources 16 to be accesses by one or more clients (e.g., clients C1 through Cn). Such additional hardware and software may include, but is not limited to, e.g., switches, bridges, web servers, and the like, which may allow clients C1 through Cn to access hardware resources 14 and/or software resources 16. Additionally, clients C1 through Cn may access cloud environment through one or more networks, including, but not limited to, the Internet, a local area network, a wide area network, or other computing network. Clients C1 through Cn may access cloud computing environment 12 using any suitable computing devices, including, but not limited to, desktop computers, notebook computers, mobile computing devices (e.g., data enabled cellular telephones, netbooks, personal digital assistants, etc.), executing various software, such as web browsers or application specific software.

Figure 2:
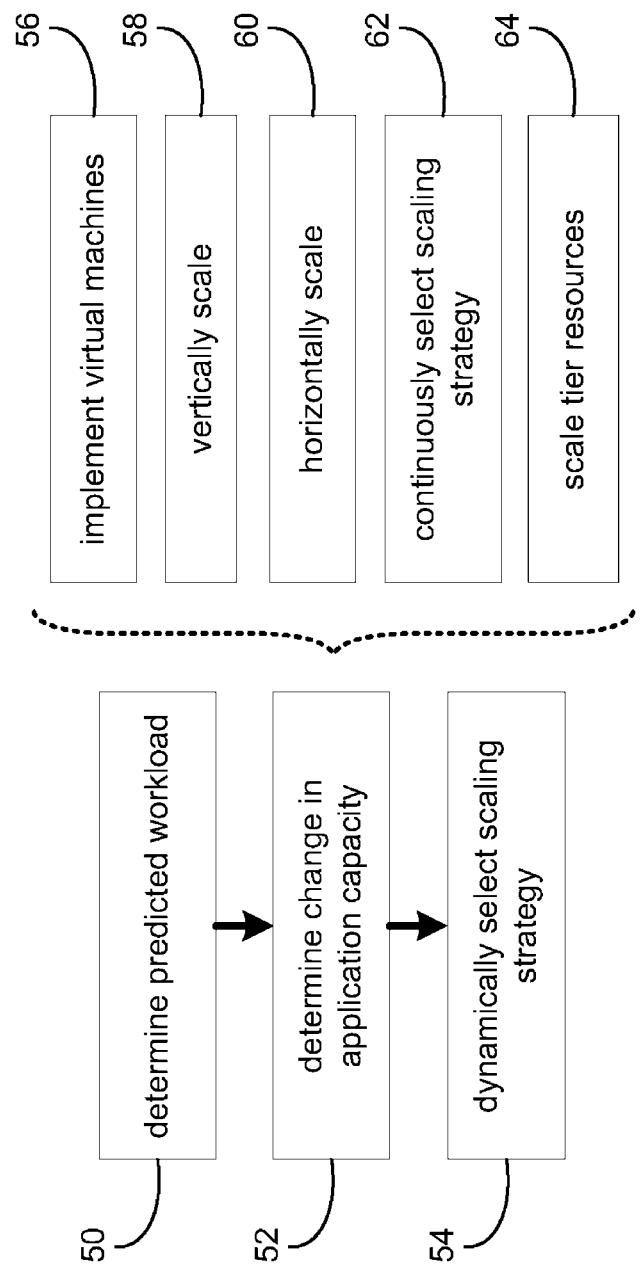
FIG. 2 is a flowchart of a process executed by the scaling process of FIG. 1.

Referring also to FIG. 2, scaling process 10 may determine 50 a predicted workload of a multi-tier application for a defined time period. Scaling process 10 may further determine 52 a change in application capacity for the predicted workload. Scaling process 10 may further dynamically select 54 a scaling strategy for the change in application capacity. The scaling strategy may include vertical scaling and horizontal scaling.

Determining 50 a predicted workload of a multi-tier application for a defined time period may utilize various prediction models, e.g., which may indicate likely workloads for the defined time period. For example, the prediction models may be based upon, at least in part, historical workload demands. For example, it may be known that for at least some cloud-based applications (e.g., application a1) workload demands may tend to occur as burst demands, in which the workload demand for application a1 may increase by many multiples, or even orders of magnitude, in a relatively short period of time. For example, application a1 may include a social networking application that may see a burst demand at the typical end of the workday. In such an embodiment, the prediction model may indicate a burst demand beginning at a general specific time of day. In other embodiments, the prediction model may indicate, for example, that if the workload demand for application a1 has increased by 20 percent over the last fifteen minutes, the ultimate workload demand may likely rise to 800 percent (relative to the initial workload demand) over the next hour. That is, the prediction model may include a statistically likely ultimate workload demand for the defined time period based upon, at least in part, a rate in change of workload demand. Additionally, based upon, at least in part, the prediction model, a statistically likely ultimate workload demand for the application a1 in the defined time period may be known. It will be appreciated that various additional/alternative prediction models may be utilized, and as such the foregoing examples should not be construed as limiting on the present disclosure.

Figure 3:
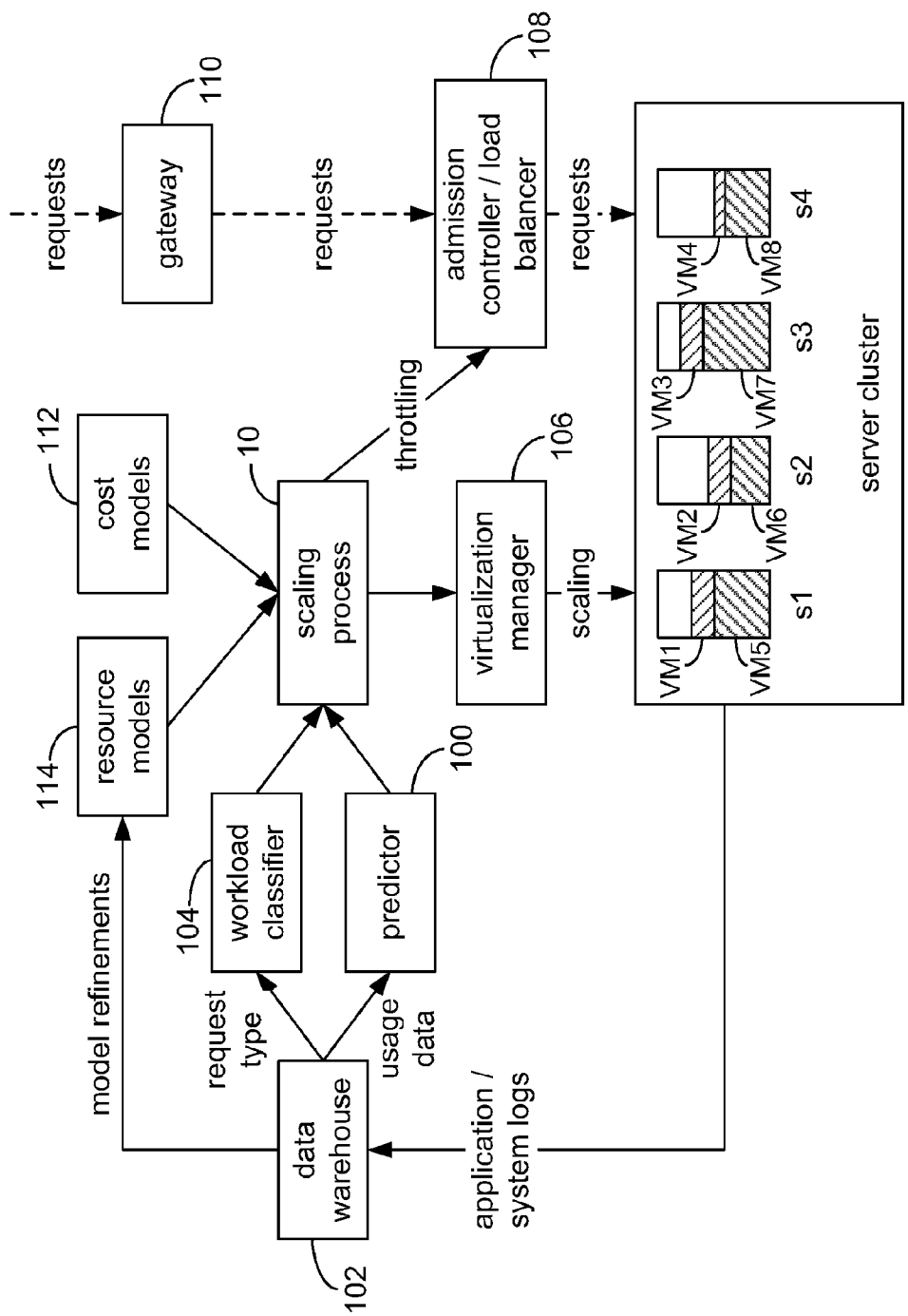
FIG. 3 diagrammatically depicts the scaling process of FIG. 1 coupled with a cloud computing system.

With reference also to FIG. 3, in one embodiment, the prediction model may be provided to scaling process 10 by predictor 100. Predictor 100 may include a component that may evaluate request histories for various types of requests passed to application a1 (e.g., which may include a multi-tier application having a variety of components or modules, and/or may include a plurality of interacting applications), and may generate statistical request prediction models for predicted workloads, types of requests, application tier, and the like. In one illustrative example, predictor 100 may utilize a time-series analysis based short-term prediction of requests arrival rate using a polynomial approximation. It will be appreciated that various additional/alternative analysis methodologies may be equally utilized.

Consistent with the illustrative example shown in FIG. 3, predictor 100 may receive request history information from data warehouse 102. In such an example, data warehouse 102 may include a repository of monitored application and system parameters (e.g., which may be received from one or more servers, e.g., servers s1, s2, s3, and s4 in the illustrated example) from one or more servers (e.g., s1, s2, s3, s4) and applications (e.g., applications a1, and a2, in the illustrated example) running in the cloud (e.g., cloud environment 12). In the case of applications (e.g., application a1) receiving multiple request types, data warehouse 102 may log the number of requests served for each request type in any given monitored time period (e.g., one minute intervals). Additionally, data warehouse 102 may also accumulate information including service level agreement (SLA) related parameters for the application. Examples of system parameters that may be logged by data warehouse 102 may include, but are not limited to, resource entitlements (e.g., CPU or time slice allocations, and RAM and/or disk space allocation) for each virtual machine (e.g., VM1, VM2, VM3, and VM4 running application a1 and VM5, VM6, VM7, and VM8 running application a2), as well as the degree of utilization of the resource entitlements by each virtual machine.

Based upon, at least in part, the determined 50 predicted workload for defined time period, scaling process 10 may determined 52 a change in application capacity for the predicted workload. As noted above, data warehouse 102 may log multiple request types, and predictor 100 may provide a prediction model that may not only include the number, or change, in request rate, but predictor 100 may also provide a prediction model that indicates the type of requests. As will be understood different request types, as well as which tiers of the application may process the requests of differing types, may influence the necessary capacity of an application (e.g., of application a1).

Consistent with the illustrated embodiment of FIG. 3, scaling process 10 may, at least in part, determine 52 a change in application capacity based upon data received from workload classifier 104. Workload classifier 104 may classify workloads into one or more sets of pre-created workload classes. In this regard, workload classifier 104 may receive information relating workload mix for an application from data warehouse 102. The information relating to workload mix for an application may include, but is not limited to, a current distribution of request types. The workload mix may influence the amount and types of resources required by an application to serve a specific number of requests having a given distribution of request types. Accordingly, based upon, at least in part, the prediction model provided by predictor 100 and the workload mix (and/or predicted workload mix according to the prediction model) provided by workload classifier 104, scaling process 10 may determine 52 a change in application capacity necessary to handle the predicted upcoming workload having a predicted request type distribution.

Based upon, at least in part, the determined 52 change in application capacity associated with the determined 50 predicted workload, scaling process 10 may dynamically select 54 a scaling strategy for the change in application capacity. The scaling strategy may include vertical scaling and horizontal scaling of the multi-tier application (e.g., application a1). As used herein, vertical scaling may include modifying the resource allocation of a particular virtual machine executing an application (e.g., VM1 executing application a1). For example, vertically scaling to increase capacity may include increasing the CPU entitlement of a virtual machine (e.g., increasing the entitlement from 0.5 cores to 0.9 cores), increasing the memory entitlement (e.g., increasing the RAM entitlement from 2 GB of RAM to 4 GB of RAM), as well as increasing any other resource entitlement of the particular virtual machine. Horizontal scaling may include creating one or more new virtual machine instances having their own resource allocations, with each of the new (as well as any previously existing) virtual machines executing the application (e.g., application a1). In the situation of horizontal scaling, each of the new virtual machines, as well as any previously existing virtual machines, executing application a1 may collectively execute application a1 to handle the predicted workload and provided the necessary change in application capacity.

The dynamically selected 54 scaling strategy may include, for example, instructing virtualization manager 106 to change the resource allocation of one or more virtual machines (e.g., VM1) executing an application (e.g., application a1). Additionally/alternatively, virtualization manager 106 may create one or more new virtual machine instances (e.g., VM2, VM3, VM4) that may execute application a1. Virtualization manager 106 may include a hypervisor, such as IBM PowerVM™ that may support online, dynamic virtual machine resizing (e.g., adding or reducing CPU or memory resources without bringing the VM down for reconfiguration), as well as creating new virtual machine instances and configurations.

Additionally, scaling process 10 may implement necessary application reconfiguration. For example, in the case of a scaling strategy including horizontal scaling, scaling process 10 may instruct admission controller/load balancer 108 to update hostlists and the like such that requests received via gateway 110 may be distributed to the newly instantiated virtual machines (e.g., VM2, VM3, VM4 as well as VM1). Such application reconfiguration may be necessary to ensure that the workload is distributed amongst the various virtual machines executing the application, in or to provide the application capacity to handle the predicted workload.

In a predicted burst workload situation the necessary application capacity to handle the predicted workload may far exceed the capacity of the currently instantiated virtual machines, thereby requiring the creation of one (or multiple) new virtual machines executing the application. Consistent with one aspect of the present disclosure, scaling process 10 may select 54 a scaling strategy that may generally balance application performance and cost. Consistent with such as aspect, and as shown in the server cluster of FIG. 3, the scaling strategy may include implementing 56 a plurality of virtual machines executing the multi-tier application. Each of the plurality of virtual machines may have generally equally configured resource allocations. At least one virtual machine may be implemented having a lower resource allocation.

For example, as will be discussed below, an instance of a virtual machine executing application a1 may have a configuration (e.g., allocation of processor, memory, etc., resources) that may provide a desired balance between application performance and cost. For the purpose of the following description, such a configuration may be termed an "optimal" configuration. However it should be appreciated that the term "optimal" is intended to indicated a subjectively desirable balance between application performance and cost, and should not be construed as limiting on the present disclosure, as other performance to cost balances may suitably be employed. For a given necessary, or desired, application capacity (e.g., the determined 52 change in application capacity), the dynamically selected 54 scaling strategy may implement a plurality of optimally configured virtual machines (e.g., a plurality of virtual machines having generally equally configured resource allocations. As it is unlikely that the determined 52 application capacity for the predicted workload may be equal to an whole number of optimally configured virtual machines, the dynamically selected 54 scaling strategy may utilize a plurality of optimally configured virtual machines to provide for the majority of the determined 52 capacity, and may utilize one or more virtual machines having a resource allocation that is less than the optimal configuration (e.g., the one or more virtual machines may have a lower CPU or memory allocation).

Consistent with the foregoing, for a determined 52 capacity C for the determined 50 predicted workload, may be distributed over M virtual machines. In an illustrative embodiment, M−1 virtual machines may be optimally configured to have a capacity of N. The $M^{th}$ virtual machine may have a capacity CM given by the formula:

$$C-(M-1)*N$$

It will be appreciated that in other embodiments, more than one virtual machine may have a capacity that is different from the capacity of an optimally configured virtual machine. In such an embodiment, X virtual machines may have a capacity that is different than the optimal capacity. In such an implementation, the aggregate capacity of the X virtual machines may be given by the formula:

$$C-(M-X)*N$$

In such an embodiment, the aggregate capacity of the X virtual machines may be divided by the X virtual machines in an equal manner or a disparate manner, depending upon design criteria and user preference.

Consistent with the foregoing description, and referring to FIG. 3, assume that initially application a1 is only implemented on a single virtual machine (VM1). Further assume that, based upon a determined 50 predicted workload, scaling process 10 may determine 52 a change in capacity for the predicted workload that is greater than three times the available capacity of an optimally configured virtual machine executing application a1. Scaling process 10 may dynamically select 54 a scaling strategy that may implement 56 a plurality of virtual machines (e.g., VM1, VM2, VM3) having generally equal resource allocation configurations (e.g., which may collectively provide for the majority of the determined 52 change in capacity for the predicted workload). Additionally, scaling process 10 may implement 56 virtual machine VM4 having a lower resource allocation, e.g., which may provide the difference between the determined 54 change in capacity and the capacity collectively provided by virtual machines VM1, VM2, VM3. As such, VM1, VM2, VM3, and VM4 may together provide a capacity necessary to accommodate the determined 52 change in capacity. As such, the foregoing scaling strategy may include vertical scaling 58 (e.g., increasing an initial resource allocation configuration of VM1 from an initial sub-optimal configuration up to an optimal configuration) and may also include horizontal scaling 60 (e.g., creating additional virtual machine instances VM2, VM3, VM4). It will be appreciated that while only four virtual machines have been discussed in this example, this is intended only for the ease of explanation and illustration, as the number of virtual machines, number of servers, and diversity of the cloud computing environment may vary greatly.

Figure 4:
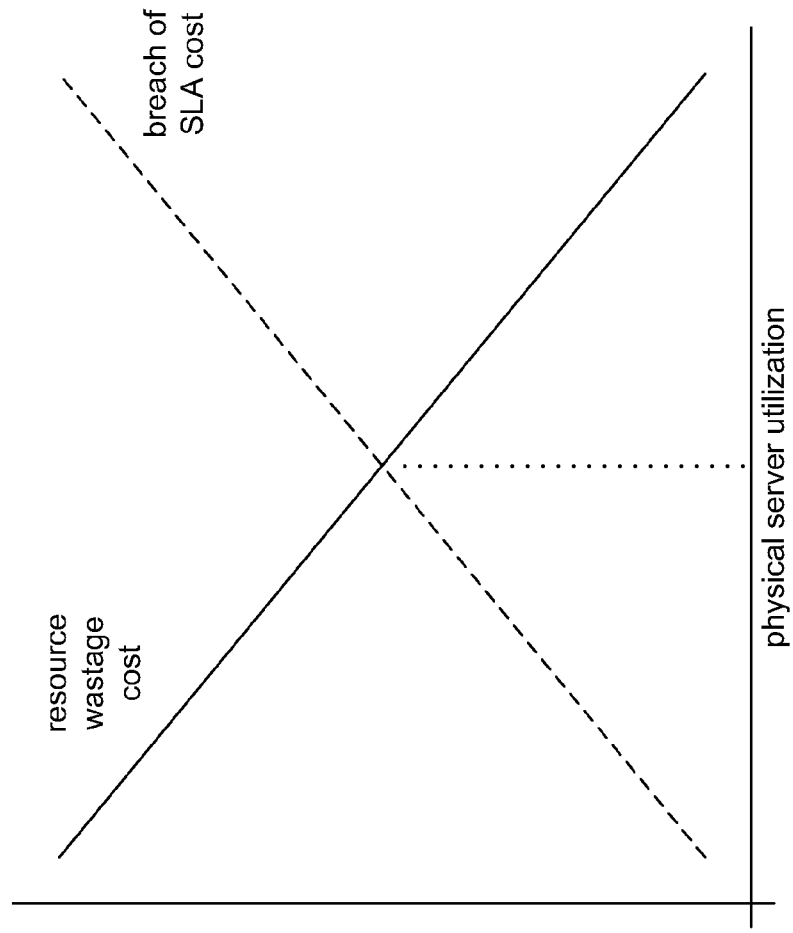
FIG. 4 graphically depicts an interaction between physical server usage, resource wastage, and breach of SLA cost.

As will be discussed in greater detail below, it may be appreciated that there may be various costs, both economic and performance-based, associated with both horizontal scaling and vertical scaling. Continuing with the concept of an optimally configured virtual machine, and referring also to FIG. 4, it will be appreciated that there may be costs associated with both under utilizing a physical server resources, and over utilizing physical server resources. For example, and as shown, when a server is minimally utilized by the applications (and associated virtual machines) running on the server, there may be a relatively high degree of resource wastage. That is, the server may be poorly utilized given the resources available. However, increasing physical server utilization (e.g., vertical scaling to increase the resources utilized by one application running on the server) may increase the risk of resource contention with other applications running on the server, may necessitate the migration of one or more instances of other applications from one physical server to another, and may give rise to SLA breaches of those applications running on the server. According to one embodiment, a desirable server utilization may generally be the intersection of the graphs of resources wastage and breach of SLA cost relative to physical server utilization. As such, it may be desirable to load the maximum number of physical server to achieve a physical server utilization at this intersection point.

Considering the above, scaling process 10 may determine the relative cost of instantiating a new virtual machine to execute another instance of a given application (e.g., application a1) on a separate server (i.e., horizontally scale application a1) and increasing the resource allocation of a virtual machine executing an existing instance of application a1 (vertically scaling application a1), which would result in utilization of a physical server beyond the intersection point of the resource wastage graphs and the breach of SLA cost graph. Scaling process 10 may determine the costs associated with horizontally scaling application a1 and vertically scaling application a1 based upon, at least in part, cost models 112.

In addition to the costs associated with utilizing a physical server beyond the above-discussed intersection point, it will be appreciated that vertical scaling may have additional practical limits and costs. For example, and as noted above, vertically scaling an instance of application a1 (e.g., increasing the resources allocated to the virtual machine running the instance of application a1) may require migration of other applications to free up the resources necessary for vertically scaling application a1 (i.e., in order to allocate such resources with the virtual machine running application a1). As such, a degree of vertical scaling may be reached at which the addition of further resources (e.g., additional CPU or memory resources) may not result in increased capacity of the application, and/or a state a diminished returns may be realized in which an incremental increase in resources for a virtual machine produced a reducing incremental increase in performance or application capacity (e.g., ability of the application to handle requests), either due to limitations imposed by the physical server, application architecture, or other constraints. According to an embodiment, the point at which a maxima of performance per allocated resources is realized may be utilized as an optimal virtual machine capacity. Of course, other configurations may take other factors into consideration, and may achieve other optimal capacity virtual machine configurations based upon such performance to cost balances.

Additionally, various costs may be associated with horizontal scaling of the application (e.g., instantiating new virtual machines running the application on additional servers). For example, as compared with vertical scaling, horizontal scaling may be relatively slow (e.g., requiring instantiation and configuration of new virtual machines, updating hostlists in gateways, and the like). As such, horizontal scaling may have an associated performance cost in that, during the time required to instantiate and configure additional virtual machines and update host lists, the application (running on the existing virtual machines) may not have the capacity to process all incoming requests. Additionally, other costs, such as software licensing costs, resources costs associated with the newly instantiated virtual machines, fragmentation, etc., may also be associated with horizontal scaling. Such costs may be provided to scaling process 10 by, e.g., cost models 112.

Consistent with the foregoing discussions, if the change in application capacity is less than a remaining capacity of the virtual machine having a lower resource allocation, selecting the scaling strategy may include vertically scaling 58 the application by vertically scaling the virtual machine having the lower resource allocation. In the above stated example, a virtual machine (e.g., VM4) may include a resource allocation that is less than an optimal resource allocation. That is, more server resources may be utilized by the virtual machine within the desired cost to performance balance. As such, dynamically selecting 54 a scaling strategy may include vertically scaling 58 VM4 to accommodate additional capacity. Vertically scaling 58 the virtual machine may include vertically scaling the virtual machine up to an optimal configuration. Additionally/alternatively vertically scaling 58 the virtual machine may include scaling the virtual machine to a resource allocation configuration that is either above or below the optimal configuration.

Additionally, as discussed above, scaling process 10 may determine 52 a change in capacity associated with the predicted workload. Determining 52 the change in capacity associated with the predicted workload may be based upon, at least in part, information provided by resource models 114. Resource models 114 may include profile driven resources models that may be indicative of resources used under various given scaling configurations. For example, resource models 114 may include information pertaining to the resources (e.g., CPU resources, memory, and the like) that may be required for a given throughput or number of requests or operations per second. The resource models may be, at least in part, empirically derived based upon information logged by data warehouse 102. Additionally/alternatively, resource models 114 may include statistical models that may be based upon, at least in part, information logged by data warehouse 102.

Further, if the change in application capacity is greater than a remaining capacity of the virtual machine having the lower resource allocation, selecting 54 the scaling strategy may include horizontally scaling 60 the application. As discussed above, horizontal scaling 60 the application may include creating additional instances of virtual machines (e.g., VM2, VM3, VM4 in the illustrative embodiment of FIG. 3) executing the application (e.g., application a1). As also discussed above, horizontal scaling 60 of the application may include adding additional virtual machines that may have differing levels of resource allocation (e.g., optimally scaled virtual machines V2, V3 and sub-optimally scaled VM4).

Dynamically selecting 54 a scaling strategy may include continuously selecting 62 a scaling strategy based upon, at least in part, the predicted workload. That is, scaling process 10 may select 54 a scaling strategy for changing conditions. For example, based upon, at least in part, determined 50 predicted workloads (e.g., which may change over time) and corresponding determined 52 changes in application capacity for the predicted workloads, scaling process 10 may change the selected 54 scaling strategy, e.g., as the predicted workload changes. As such, scaling process 10 may continuously, and adaptively select 54 a scaling strategy as conditions and predicted workloads change. Continuously selecting 62 a scaling strategy may include making ongoing, real-time adjustments to the selected scaling strategy. Additionally/alternatively, continuously selecting 62 a scaling strategy may include intermittently (e.g., at predetermined time intervals, or based upon a change in conditions, such as application performance or predicted workload) selecting 54 a scaling strategy (including adjusting an selected general strategy).

Dynamically selecting 54 a scaling strategy may include scaling 64 resources associated with a determined tier of the multi-tier application. For example, as discussed above, application a1 may include a plurality of module or components (e.g., which may include a plurality of interacting applications). Application a1 may receive multiple request types that may require processing, or action to be taken, by different tiers of application a1. Further, the processing or actions to be taken by different tiers may utilize different resources (e.g., some processing or actions may require more RAM while other processing or actions may require greater CPU allocations), and/or may be executed by modules or components (e.g., including one or more interacting applications) that may be executed by different virtual machines. As such, dynamically selecting 54 a scaling strategy may include scaling 64 resources (such as CPU allocation, RAM allocations, or individual or sets of virtual machines) associated with a determined tier of a multi-tier application based upon, at least in part, a determined 50 predicted workload and a determined 52 change in application capacity of different tiers of a multi-tier application. In some situations, resources associated with all tiers of a multi-tier application may be scaled 64, but the scaling (e.g., in terms of degree of scaling; virtual machine configuration; resources allocated; type and degree of type of scaling, such as vertical and horizontal scaling; and the like) may differ for different tiers of the multi-tier application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of scaling comprising:
   determining, by a computing device, a predicted workload of a multi-tier application for a defined time period;
   the multi-tier application running on a plurality of virtual machines, including a first virtual machine of a plurality of the virtual machines having a lower resource allocation than other virtual machines of the plurality of virtual machines having approximately equally configured resource allocations;
   determining, by the computing device, a change in the multi-tier application resource capacity for the predicted workload including;
   comparing the change in the multi-tier application resource capacity to a remaining resource capacity of the first virtual machine; and
   dynamically selecting, by the computing device, a scaling strategy for the change in the multi-tier application resource capacity;
      if the change in the multi-tier application resource capacity is less than a remaining resource capacity of the first virtual machine having a lower resource allocation the scaling strategy including vertical scaling that includes increasing resource entitlement within one of the plurality of virtual machines;
      if the change in the multi-tier application resource capacity is greater than a remaining resource capacity of the first virtual machine having the lower resource allocation the scaling strategy including vertical scaling and horizontal scaling that includes a creating at least one additional virtual machine to the plurality of virtual machines.

2. The method of claim 1, wherein selecting the scaling strategy includes vertically scaling the virtual machine having the lower resource allocation up to the approximately equally configured resource allocation.

3. The method of claim 2, wherein selecting the scaling strategy includes vertically scaling the virtual machine having the lower resource allocation up to the approximately equally configured resource allocation and horizontally scaling the multi-tier application including implementing a new virtual machine having a resource allocation less than the approximately equally configured resource allocation.

4. The method of claim 1, wherein dynamically selecting a scaling strategy includes continuously selecting a scaling strategy based upon, at least in part, the predicted workload.

5. The method of claim 1, wherein determining a predicted workload is based upon, at least in part, historical workload demands.

6. The method of claim 1, wherein dynamically selecting a scaling strategy includes scaling resources associated with a determined tier of the multi-tier application.

7. A method of scaling comprising:
   determining, by a computing device, a predicted workload of a multi-tier application for a defined time period;
   the multi-tier application running on a plurality of virtual machines, including a first virtual machine of a plurality of the virtual machines having a lower resource allocation than other virtual machines of the plurality of virtual machines having approximately equally configured resource allocations;
   determining, by the computing device, a change the multi-tier application resource capacity for the predicted workload;
   comparing the change in the multi-tier application resource capacity to a remaining resource capacity of the first virtual machine;
   dynamically selecting, by the computing device, a scaling strategy for the change in the multi-tier application resource capacity, the scaling strategy including implementing a plurality of virtual machines executing the multi-tier application, each of the plurality of virtual machines having approximately equally configured resource allocations, and implementing at least one virtual machine having a lower resource allocation;
      if the change in the multi-tier application resource capacity is less than a remaining resource capacity of the first virtual machine having a lower resource allocation the scaling strategy including vertical scaling that includes increasing resource entitlement within one of the plurality of virtual machines; and
      if the change in the multi-tier application resource capacity is greater than a remaining resource capacity of the first virtual machine having the lower resource allocation the scaling strategy including vertical scaling and horizontal scaling that includes a creating at least one additional virtual machine to the plurality of virtual machines.

* * * * *